United States Patent
Burlington

(10) Patent No.: US 8,011,062 B2
(45) Date of Patent: *Sep. 6, 2011

(54) VACUUM CLEANER MOTOR ASSEMBLY

(75) Inventor: Guy James Burlington, Gloucestershire (GB)

(73) Assignee: Dyson Technology Limited, Malmesbury (GB)

( * ) Notice: Subject to any disclaimer, the term of this patent is extended or adjusted under 35 U.S.C. 154(b) by 911 days.

This patent is subject to a terminal disclaimer.

(21) Appl. No.: 11/579,632

(22) PCT Filed: May 5, 2005

(86) PCT No.: PCT/GB2005/001702
§ 371 (c)(1),
(2), (4) Date: Nov. 6, 2006

(87) PCT Pub. No.: WO2005/107558
PCT Pub. Date: Nov. 17, 2005

(65) Prior Publication Data
US 2008/0022486 A1    Jan. 31, 2008

(30) Foreign Application Priority Data
May 6, 2004   (GB) .................................. 0410081.4

(51) Int. Cl.
*A47L 5/26* (2006.01)
(52) U.S. Cl. .......................................... 15/390; 15/412
(58) Field of Classification Search .................... 15/412, 15/389–391
See application file for complete search history.

(56) References Cited

U.S. PATENT DOCUMENTS

| 2,037,648 | A | * | 4/1936 | Bergstrom | ...................... 15/179 |
| 2,633,597 | A | | 4/1953 | Turner | |
| 2,879,874 | A | | 3/1959 | Malmros | |
| 3,425,528 | A | | 2/1969 | Perruca | |
| 3,861,228 | A | | 1/1975 | Adams | |

(Continued)

FOREIGN PATENT DOCUMENTS

DE          2312636          9/1974

(Continued)

OTHER PUBLICATIONS

International Search Report mailed on Aug. 25, 2005, for PCT patent application No. PCT/GB2005/001702 filed on May 5, 2005, 5 pages.

(Continued)

*Primary Examiner* — David Redding
(74) *Attorney, Agent, or Firm* — Morrison & Foerster LLP

(57) ABSTRACT

A vacuum cleaner motor assembly includes a motor in a bucket, configured so as to drive a fan to provide airflow. An epicyclic gear system is attached to the output shaft of the motor, to produce an output of reduced rotational speed. The output is employed to drive an agitator via a belt. The belt is driven at a reduced rotational speed to that achievable hitherto, and thus there is reduced wear on the belt. The provision of a gear arrangement mounted directly to the motor casing provides a compact assembly. One of the epicyclic gears, such as the ring gear, is arranged to slip with respect to a clutch member if the agitator becomes jammed. An actuator switches off the motor if the heat of friction of the slipping gear exceeds a predetermined value, or if the slipping gear rotates at a speed above a predetermined value. Thus, the motor switches off before damage occurs to any of the components of the system.

27 Claims, 4 Drawing Sheets

U.S. PATENT DOCUMENTS

| | | | |
|---|---|---|---|
| 3,903,712 A | 9/1975 | Richter et al. | |
| 4,025,832 A | 5/1977 | Jones, III | |
| 4,099,291 A | 7/1978 | Bowerman | |
| 4,220,231 A | 9/1980 | Richter et al. | |
| 4,245,370 A | 1/1981 | Baker | |
| 4,357,730 A | 11/1982 | Lex | |
| 4,370,690 A | 1/1983 | Baker | |
| 4,561,529 A | 12/1985 | McIntosh | |
| 4,572,343 A | 2/1986 | Boffelli | |
| 4,624,153 A | 11/1986 | Itoh et al. | |
| 4,660,247 A | 4/1987 | Frohbieter et al. | |
| 4,722,426 A | 2/1988 | Bellanger | |
| 5,701,633 A | 12/1997 | Jonischus | |
| 6,085,382 A * | 7/2000 | Bobrosky et al. | 15/350 |
| 6,120,399 A | 9/2000 | Okeson et al. | |
| 6,400,048 B1 * | 6/2002 | Nishimura et al. | 310/47 |
| 6,437,465 B1 * | 8/2002 | Nishimura et al. | 310/47 |
| 6,484,352 B2 * | 11/2002 | Huebsch et al. | 15/339 |
| 6,553,611 B2 * | 4/2003 | Huebsch et al. | 15/339 |
| 6,662,882 B2 | 12/2003 | Hansson | |
| 7,222,392 B2 * | 5/2007 | McCormick et al. | 15/353 |
| 7,731,618 B2 * | 6/2010 | Burlington et al. | 475/263 |
| 2001/0039691 A1 * | 11/2001 | Bobrosky et al. | 15/339 |
| 2002/0128117 A1 | 9/2002 | Schroder et al. | |
| 2004/0025287 A1 * | 2/2004 | McCormick et al. | 15/353 |
| 2004/0112705 A1 | 6/2004 | Watt | |
| 2005/0091783 A1 * | 5/2005 | Sepke et al. | 15/320 |
| 2006/0075599 A1 * | 4/2006 | Kimmerle et al. | 15/383 |
| 2006/0191097 A1 * | 8/2006 | Baumhakel | 15/320 |
| 2006/0195991 A1 * | 9/2006 | Baumhakel | 15/49.1 |
| 2007/0094836 A1 * | 5/2007 | Sepke et al. | 15/320 |
| 2007/0113372 A1 * | 5/2007 | McCormick et al. | 15/351 |
| 2008/0105510 A1 | 5/2008 | Burlington et al. | |
| 2008/0276410 A1 * | 11/2008 | Sepke et al. | 15/321 |

FOREIGN PATENT DOCUMENTS

| | | |
|---|---|---|
| DE | 4412986 | 10/1995 |
| DE | 19805899 | 7/1999 |
| DE | 201-15-407 U1 | 11/2001 |
| GB | 147507 | 11/1921 |
| GB | 2-364-556 A | 1/2002 |
| JP | 01-120441 A | 5/1989 |
| JP | 08-126596 A | 5/1996 |
| JP | 2001-017358 A | 1/2001 |
| WO | WO 99/29223 A1 | 6/1999 |

OTHER PUBLICATIONS

International Preliminary Report on Patentability for PCT patent application No. PCT/GB2005/001702 filed on May 5, 2005, 7 pages.

Burlington, G., U.S. Office Action mailed Apr. 13, 2009, directed to related U.S. Appl. No. 11/547,039; 9 pages.

Burlington, G., U.S. Office Action mailed Sep. 21, 2009, directed to related U.S. Appl. No. 11/547,039; 7 pages.

* cited by examiner

VACUUM CLEANER MOTOR ASSEMBLY

REFERENCE TO RELATED APPLICATIONS

This application is a national stage application under 35 USC 371 of International Application No. PCT/GB2005/01702, filed May 5, 2005, which claims the priority of United Kingdom Application No. 0410081.4, filed May 6, 2004, the contents of both of which prior applications are incorporated herein by reference.

FIELD OF THE INVENTION

This invention relates to a motor assembly employed in a vacuum cleaner.

BACKGROUND OF THE INVENTION

Vacuum cleaners typically comprise a downwardly directed dirty-air inlet arranged in the cleaner head or a floor tool, through which dirty air is sucked, by means of a motor-driven fan, into dirt and dust separation apparatus. An agitator, such as a brush bar, may be arranged in the mouth of the dirty air inlet so as to agitate the fibres of a carpet over which the vacuum cleaner is passed. The agitator helps to release dirt and dust trapped in the carpet. The agitator is normally driven by means of a motor via a gear or belt transmission system. The motor may be a dedicated agitator motor or a turbine, or may be the vacuum motor that powers the cleaner.

In the case that the vacuum motor is employed, a system of belts and pulleys may be employed between the motor and the agitator to transmit torque to the agitator. The relative diameters of the pulleys are arranged so as to reduce the rotational speed of the motor to a suitable rotational speed for the agitator.

A problem which may be encountered with this system is that some of the belts are driven at high speeds, which causes wear. Over time, these belts deteriorate and need periodical replacement.

It is desirable to be able to bring the agitator into and out of operation. In the case that the agitator is driven by the vacuum motor, a clutch mechanism may be provided. When the clutch is engaged, torque generated by the motor is applied to the agitator. When the clutch is disengaged, torque is not applied to the agitator.

A further problem which may be encountered with vacuum cleaners having an agitator is that, on occasion, the agitator may become jammed by becoming entangled with objects on the floor surface, for example, or by being pressed hard into the floor. It has been proposed to provide means for limiting the torque applied to the jammed agitator by, for example, causing a drive belt to slip. However, this may cause further deterioration of the belt, thereby reducing its lifetime. This is a nuisance to the user.

SUMMARY OF THE INVENTION

The invention provides a vacuum cleaner motor assembly comprising a vacuum motor arranged to drive a fan to provide suction airflow and an epicyclic gear system in communication with the motor arranged to produce an output of reduced rotational speed to that generated by the motor, the output being arranged to drive an agitator.

The provision of an epicyclic gear system allows an output of reduced rotational speed to be employed to drive an agitator. This obviates the need for a speed-reduction system of pulleys and belts, thereby reducing belt wear.

Preferably, the gear system is secured to the motor housing and is mounted directly to the shaft of the motor. This provides a compact arrangement, giving a direct input from the motor to the gears.

Advantageously, the shaft of the motor comprises a gear, such as the sun gear of the epicyclic system, to provide direct rotational input to the gear system.

A clutch mechanism may be provided. One of the gears may comprise a clutch member which is arranged to slip if the agitator becomes jammed, thereby preventing damage to the clutch and gears. A characteristic of the slipping gear, such as rotational speed, or the temperature rise caused by friction, may be employed in order to interrupt transmission of torque to the output. This may be effected by causing the motor to switch off.

BRIEF DESCRIPTION OF THE DRAWINGS

The invention will now be described, by way of example, with reference to the accompanying drawings, in which:—

DETAILED DESCRIPTION OF THE INVENTION

Figure 1:
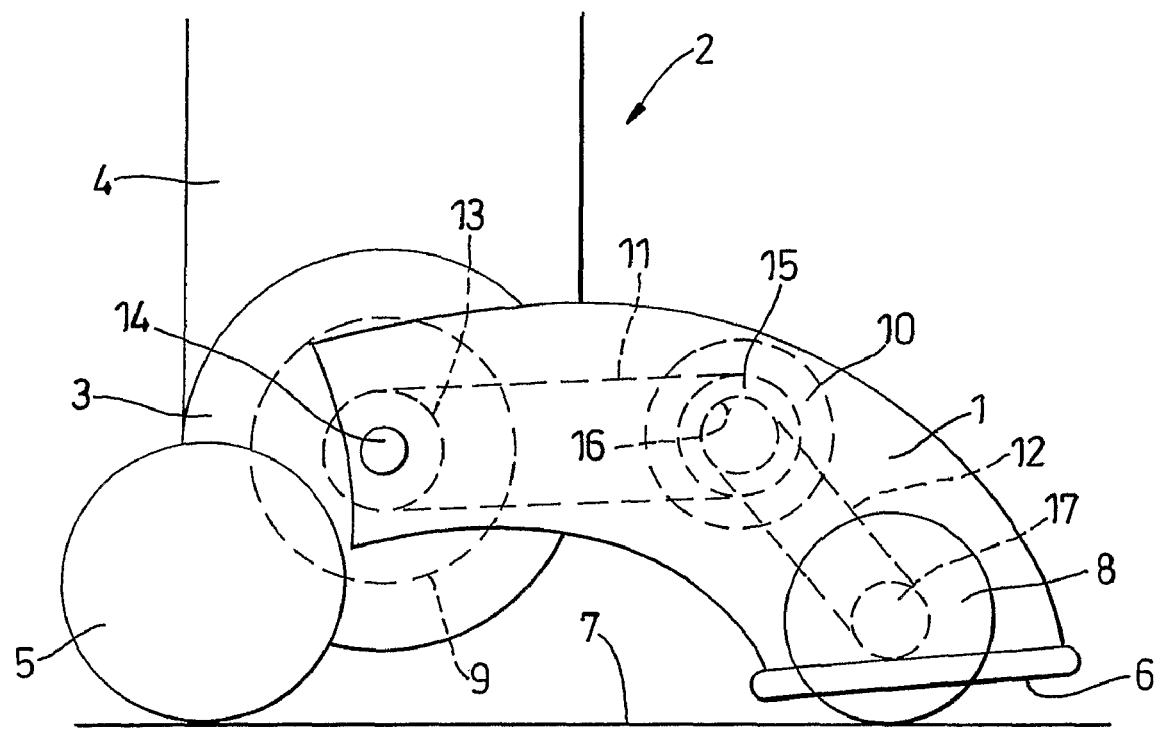
FIG. 1 is a schematic side view of the cleaner head of a vacuum cleaner incorporating a prior art motor assembly.

FIG. 1 illustrates schematically the cleaner head 1 of a vacuum cleaner, indicated generally by the reference numeral 2. The cleaner head 1 is pivotably mounted on a motor assembly 3 located at the lower end of a main body 4 in which dust-separating apparatus (not shown) is housed. The dust separating apparatus may take the form of a dust bag, cyclonic separator or other filter. A pair of wheels 5 is also mounted on the main body 4, from which the cleaner head 1 extends in a forward direction.

The cleaner head 1 has a dirty air inlet 6 located at its forward end and facing downwardly so that, in use, the dirty air inlet 6 rests on the surface 7 to be cleaned, which is usually a floor or carpet. An agitator in the form of a brush bar 8 is rotatably mounted in a known manner by means of bearings (not shown) so that the brush bar 8 extends across substantially the entire width of the dirty air inlet 6. The brush bar 8 protrudes slightly out of the dirty air inlet 6 so as to agitate the fibres of a carpet being cleaned and so enhance the cleaning process.

A motor 9 is housed within the motor assembly 3, and is used to provide suction airflow into the dust-separating apparatus by driving a fan (not shown). The motor 9 is also employed to drive the brush bar 8. A clutch mechanism 10 is provided, located between the motor 9 and the brush bar 8. Drive belts 11, 12 are arranged so as to transfer torque from the motor 9 to the clutch mechanism 10 and from the clutch mechanism to the brush bar 8 respectively. The motor 9 carries a drive pulley 13 for receiving the drive belt 11. The drive belt 11 could equally be carried directly on the motor shaft 14. The drive belt 11 is also carried by a driven pulley 15 forming part of the clutch mechanism 10. The clutch mechanism 10 also has a drive pulley 16 which carries the drive belt 12, which is also carried by a pulley 17 on the brush bar 8.

The relative diameters of the pulleys 13, 14, 15, 16 are designed to gear down the rotational speed of the motor (commonly 30-40 k rpm) to a suitable rotation speed for the brush bar 8. A suitable rotational speed for a brush bar is typically 3.5-5 k rpm. In this arrangement, some of the belts are driven at high rotational speeds, which causes wear. Over time, these belts deteriorate and need periodical replacement. If the belts are arranged to slip when the agitator becomes jammed, further deterioration of the belts occurs.

Figure 2:
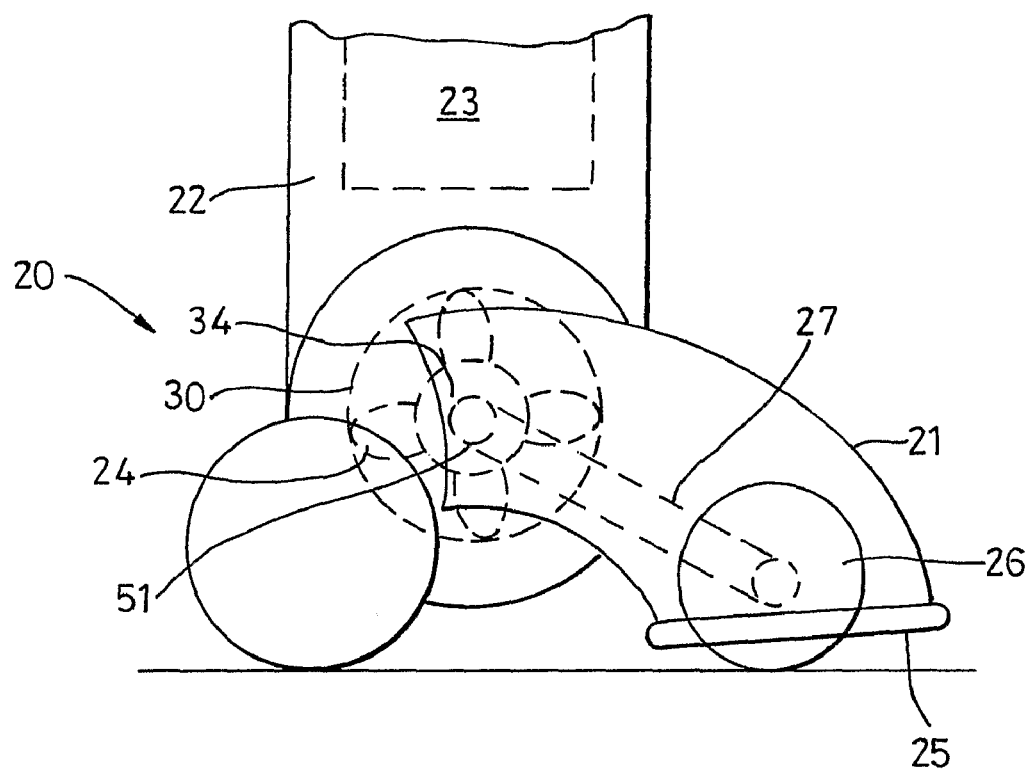
FIG. 2 is a schematic side view of the cleaner head of a vacuum cleaner incorporating a motor assembly constructed according to the invention.
Figure 3:
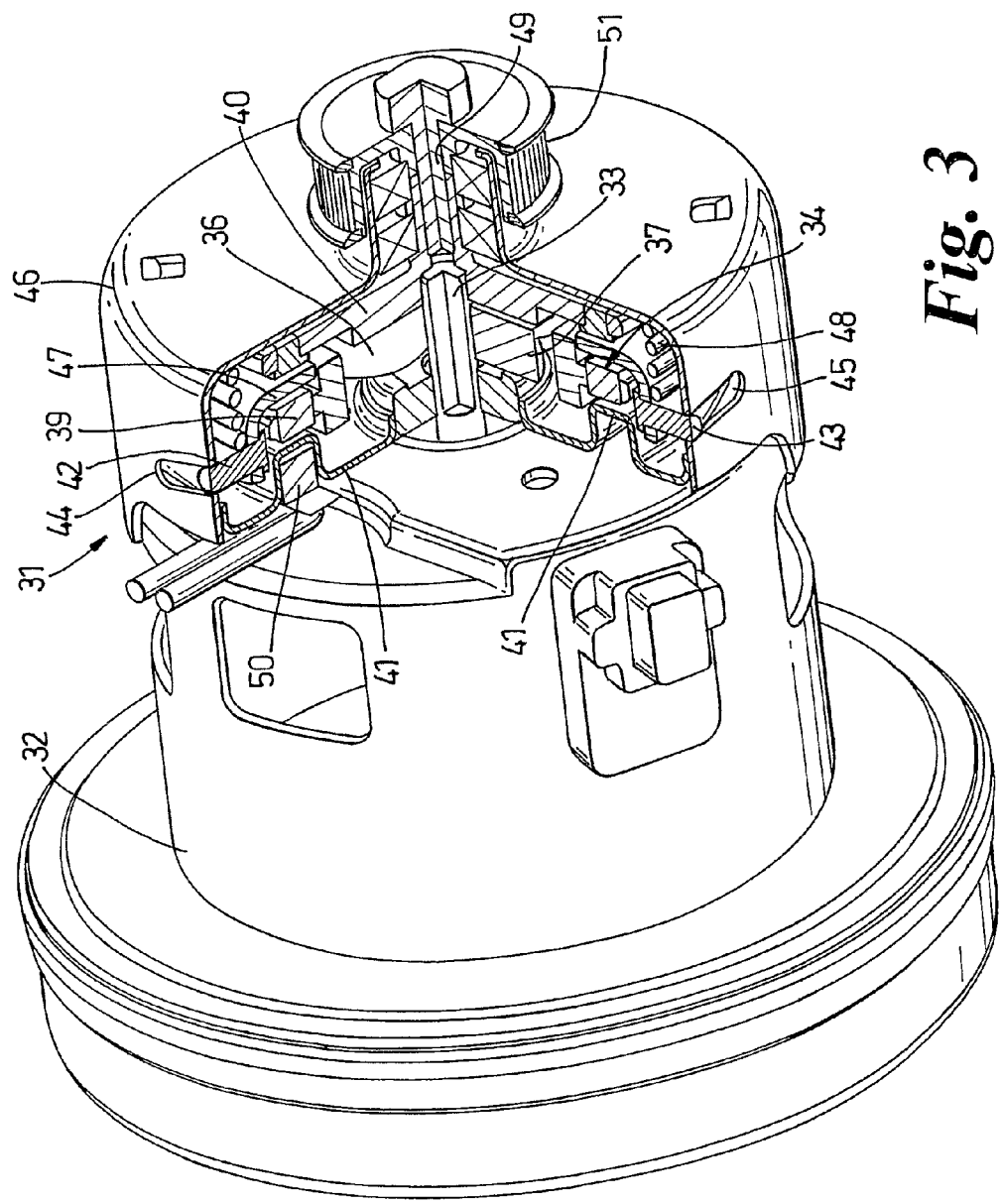
FIG. 3 is a partly sectional perspective view of the motor assembly of FIG. 1.

A motor assembly constructed according to the invention is illustrated in FIGS. 2 and 3.

With reference to FIG. 3, the motor assembly is indicated generally by the reference numeral 30. The motor assembly 30 comprises a motor, which is encased in a housing 32 known as a motor bucket and so is not visible in this drawing, save for its output shaft 33. The motor is arranged to rotatably drive a fan (not visible in this drawing) at a first rotational speed, to produce a suction airflow through the cleaner. A clutch mechanism, indicated generally by the reference numeral 31, is attached to the motor housing 32 and is shown in the disengaged position.

In accordance with the invention, a speed-reduction gear system 34 is provided and comprises an epicyclic system, mounted directly onto the motor housing 32, onto the shaft 33. The gear system 34 is arranged to reduce the high rotational speed of the output shaft 33 down to a more suitable speed for rotating the brush bar.

Figure 4A:
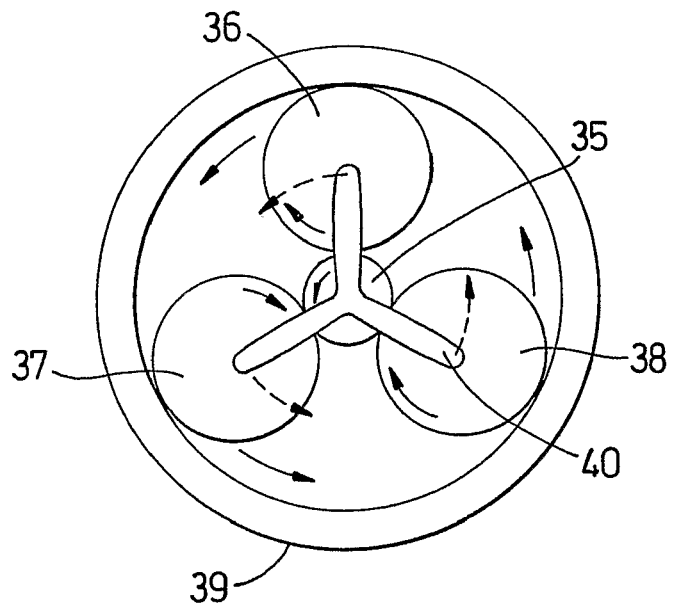
FIGS. 4a and 4b are sectional side views of part of a speed reduction gearing for the motor assembly of FIG. 3, in two modes of operation.

With reference to FIGS. 3 and 4, the epicyclic gear system 34 comprises a sun gear 35 that, in this arrangement is the input gear. The sun gear 35 may be pushed on to the end of the motor shaft 33 or may be an integral part of the shaft. The sun gear 35 in the illustrated embodiment has been cut into the motor shaft 33. The sun gear 35 meshes with a plurality of planet gears 36, 37, 38, arranged equidistantly around the sun gear 35. Only two of the planet gears are visible in FIG. 3, and are shown without teeth for clarity. The planet gears 36, 37, 38 share the load and provide balance to the gear system 34. The planet gears 36, 37, 38 are rotatably arranged inside a ring gear 39. The gear system 34 further comprises an output in the form of a planet carrier 40. The general scheme of operation of the gear system 34 will now be described with reference to FIG. 4a.

FIG. 4a schematically shows the epicyclic gear system. In this drawing, the planet carrier 40 is shown as a member having three arms, so that the rest of the gear train is visible. In the embodiment of FIG. 3, the planet carrier 40 is actually in the form of a disc having three collars arranged to engage with respective central apertures of the planet gears 36, 37, 38, and having a short output shaft. As with FIG. 3, the gear system 34 shown in this drawing does not include gear teeth for clarity.

In operation, torque is input to the gear system by means of the central sun gear 35. The planet gears 36, 37, 38 mesh with the central sun gear 35 and try to rotate in the opposite rotational direction to the sun gear. Each planet gear 36, 37, 38 meshes with teeth on the internal diameter of the ring gear 39. Thus, as the planet gears 36, 37, 38 rotate, they roll along the inner surface of the ring gear 39, and so the gears themselves move in the same direction as the direction of rotation of the sun gear. This motion, in turn, causes the planet carrier to move in the same direction (shown by the broken arrow). Hence, torque imparted to the sun gear 35 is transmitted to the planet carrier 40, albeit at a reduced rotational speed.

Referring back to FIG. 3, one of the clutch members of the clutch mechanism 31 includes a plate 41 attached to the rear of the motor housing 32. The other of the clutch members includes the ring gear 39. Clutch engagement means is provided in the form of cam members, two of which 42, 43 are shown in part in FIG. 3. The cam members 42, 43, are constrained to move in slots 44, 45 respectively, which extend obliquely around the housing 46 for the gear system 34. Rotation of the cam members 42, 43 along the slots 44, 45 causes the cam members to move laterally. Clockwise rotation of the cam members 42, 43, as viewed in this drawing, causes the cam members to move towards the motor housing 32. A disc 47 is associated with the cam members 42, 43, such that rotation of the cam members causes movement of the disc along the axis of the shaft 33. The disc 47 is arranged adjacent the ring gear 39 such that clockwise rotation of the cam members 42, 43 causes the disc to bear against the ring gear. Thus, the ring gear 39 is pressed into intimate contact with the plate 41. The spring 48 assists in urging the clutch into the engaged position. The clutch disengages against the action of the spring 48. In this manner, the clutch members can be brought into and out of engagement.

When the clutch mechanism 31 is in the engaged position, the ring gear 39 is held stationary against the plate 41. A spindle 49 associated with the second clutch member engages the end of the planet carrier 40. When the motor rotates the shaft 33, torque is transmitted to the sun gear 35 and to the planet carrier 40 by means of the planet gears 36, 37, 38. Hence, torque is transmitted to the spindle 49 and this rotary motion, at a reduced speed from that output by the motor to drive the fan, is employed to drive the brush bar via a pulley 51 mounted on the spindle. This assembly is a more compact arrangement than was achievable hitherto.

FIG. 2 schematically illustrates part of a vacuum cleaner 20 incorporating the motor assembly of FIG. 3. The vacuum cleaner 20 comprises a cleaner head 21, pivotably mounted to a main body 22 incorporating the motor assembly 30 and dust-separating apparatus 23. The motor assembly 30 is arranged, in use, the drive a fan 24, to produce airflow from a dirty air inlet 25 in the cleaner head 21, through to the dust-separating apparatus 23. The motor assembly 30 is also arranged to drive the agitator in the form of a brush bar 26, via the pulley 51 and a belt 27. The pulley 51 rotates at a reduced speed relative to that of the fan 24. The pulley 51 imparts rotary motion to the belt 27 and hence to the brush bar 26. The gear system 34 associated with the motor reduces the rotational speed of the pulley 51 to that suitable for driving the brush bar 26. Thus, the belt 27 is driven at a much slower speed than was achievable hitherto, and therefore experiences reduced wear and tear.

Figure 4B:
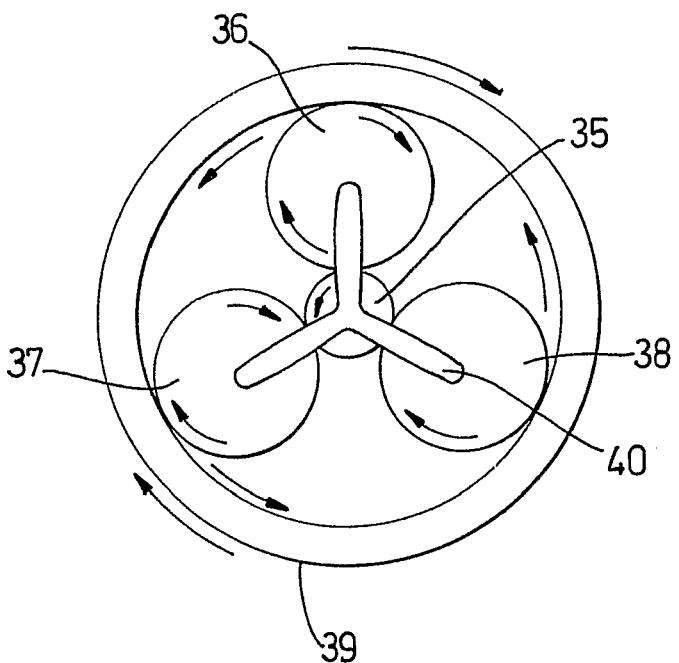

In the event of excessive load being placed on the brush bar such that the brush bar becomes jammed, the planet carrier 40 comprising the output of the gearing system 34 consequently becomes stationary. FIG. 4b shows the rotational directions of the components of the gear system 34 during an overload condition. In this situation, the planet carrier cannot move. Thus, torque generated by the motor and input to the gearing system by means of the sun gear 35 causes the ring gear 39 to rotate. The ring gear 39 turns whilst in intimate contact with the plate 41 attached to the rear of the motor housing 32. Thus, the edge of the ring gear 39 slips against the corresponding surface on the plate 41, thereby generating heat energy of friction.

An actuator in the form of a thermally activated switch 50 is located in the space between the motor housing 32 and the plate 41, and is in thermal contact with the plate. Thus, as the plate 41 heats up, the temperature at the actuator 50 rises. When the temperature at the actuator 50 exceeds a predetermined value, the switch is arranged to switch off the motor completely. Thus, torque is not transmitted to the brush bar by virtue of in operation of the motor.

Alternatively, the actuator may be arranged, in combination with suitable electronic circuitry (not shown), to come into effect when the temperature rises at a fast rate or when the temperature rises beyond a certain point for a predetermined period of time. The choice and set-up of a suitable actuator is within the abilities of the skilled person.

As a further alternative, the actuator 50 may take the form of a switch arranged to interrupt transmission of torque in dependence on the rotational speed of the ring gear 39. For example, the actuator may cause the motor to be switched off when the rotational speed of the ring gear 39 exceeds a predetermined value. Alternatively, the rate of change of speed may be employed to trip the switch or else a predetermined rotational speed for a predetermined time period.

The actuator 50 may be arranged to restart the motor when, for example, the actuator has cooled to below a predetermined temperature or when the rotational speed of slippage of the clutch member 19 is below a predetermined value. However, for safety reasons, it may be preferable to arrange that the user resets the system by switching the cleaner off at the mains power supply and then on again. The provision of an actuator that responds to a rise in a characteristic (such as temperature or speed) of the slipping clutch members reduces the risk of false triggering caused by momentary rises in load, such as occurs on start-up of the brush bar.

Variations may be made without departing from the scope of the invention. For example, the actuator 50 of FIG. 3 need not produce electrical disengagement of the motor, but may instead effect physical disengagement of the clutch members. In both embodiments, the effect is that the system does not attempt to transmit torque to an overloaded brush bar.

Suitable thermal actuators include those incorporating bimetallic devices and so-called memory metals. Suitable speed actuators include those incorporating optical sensors and magnetic detectors, such as Hall effect sensors, arranged to detect a marker on the ring gear.

The agitator need not be driven by a belt and pulley system, as a direct drive arrangement may be employed, removing the need for belts.

The invention claimed is:

1. A vacuum cleaner motor assembly, comprising:
   a vacuum motor,
      connected to a fan so as to drive the fan to provide suction airflow for the vacuum cleaner, and
      connected to an epicyclic gear system so as to produce an output of a rotational speed that is reduced as compared to that generated by the motor, the output being configured so as to drive an agitator; and
   a clutch mechanism comprising clutch members having an engaged position, in which torque generated by the motor is transmitted to the output and a disengaged position in which torque is not transmitted to the output, the clutch members being capable of slipping.

2. A motor assembly as claimed in claim 1, in which the motor is located in a housing, and the gear system is attached to the housing.

3. A motor assembly as claimed in claim 1 or 2, in which the motor has a shaft and the gear system is mounted to the shaft.

4. A motor assembly as claimed in claim 3, in which an end portion of the shaft comprises an input gear of the gear system.

5. A motor assembly as claimed in claim 3, in which an end portion of the shaft is secured to an input gear of the gear system.

6. A motor assembly as claimed in claim 4, in which the input gear comprises the sun gear of the epicyclic gear system.

7. A motor assembly as claimed in claim 1 or 2, in which the output comprises the planet carrier of the epicyclic gear system.

8. A motor assembly as claimed in claim 1 or 2, in which the output drives the agitator by means of a belt.

9. A motor assembly as claimed in claim 1 or 2, in which the agitator comprises a brush bar.

10. A motor assembly as claimed in claim 1, in which one of the clutch members comprises a gear of the gear system.

11. A motor assembly as claimed in claim 10, in which the gear of the gear system comprises the ring gear of the epicyclic gear system.

12. A motor assembly as claimed in claim 1, further comprising an actuator associated with a clutch member and configured so as so that, if the clutch members slip and a characteristic associated with slipping of the clutch members is above a predetermined value, transmission of torque to the output is interrupted.

13. A motor assembly as claimed in claim 12, in which the actuator comprises a switch configured so as to interrupt transmission of torque by switching off the motor.

14. A motor assembly as claimed in claim 12, in which the characteristic comprises a rise in temperature due to slipping of the clutch members, the actuator being configured so as to interrupt transmission of torque when the temperature exceeds a predetermined value or when the rate of change of temperature exceeds a predetermined value or when the temperature exceeds a predetermined value for a predetermined time.

15. A motor assembly as claimed in claim 12, in which the characteristic comprises a relative rotational speed of one clutch member with respect to another, the actuator being configured so as to interrupt transmission of torque when the rotational speed exceeds a predetermined value or when the rate of change of rotational speed exceeds a predetermined value or when the rotational speed exceeds a predetermined value for a predetermined time.

16. A vacuum cleaner including a motor assembly as claimed in claim 1 or 2.

17. A motor assembly as claimed in claim 5, in which the input gear comprises the sun gear of the epicyclic gear system.

18. A motor assembly as claimed in claim 5, in which the input gear comprises the planet gear of the epicyclic gear system.

19. A motor assembly as claimed in claim 10, further comprising an actuator associated with a clutch member and configured so as so that, if the clutch members slip and a characteristic associated with slipping of the clutch members is above a predetermined value, transmission of torque to the output is interrupted.

20. A motor assembly as claimed in claim 19, in which the actuator comprises a switch configured so as to interrupt transmission of torque by switching off the motor.

21. A motor assembly as claimed in claim 19, in which the characteristic comprises a rise in temperature due to slipping of the clutch members, the actuator being configured so as to interrupt transmission of torque when the temperature exceeds a predetermined value or when the rate of change of temperature exceeds a predetermined value or when the temperature exceeds a predetermined value for a predetermined time.

22. A vacuum cleaner including a motor assembly as claimed in claim 3.

23. A vacuum cleaner including a motor assembly as claimed in claim 5.

24. A vacuum cleaner including a motor assembly as claimed in claim 1.

25. A vacuum cleaner including a motor assembly as claimed in claim 12.

26. A vacuum cleaner including a motor assembly as claimed in claim 14.

27. A vacuum cleaner including a motor assembly as claimed in claim 15.

* * * * *